United States Patent
Roy-Auberger et al.

(10) Patent No.: US 9,683,180 B2
(45) Date of Patent: Jun. 20, 2017

(54) VACUUM DISTILLATE HYDROTREATMENT PROCESS EMPLOYING A CONCATENATION OF CATALYSTS

(71) Applicant: IFP ENERGIES NOUVELLES, Rueil-Malmaison (FR)

(72) Inventors: Magalie Roy-Auberger, Nivolas-Vermelle (FR); Emmanuelle Guillon, Vourles (FR); Aline Grezaud, Lyons (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 178 days.

(21) Appl. No.: 14/554,242

(22) Filed: Nov. 26, 2014

(65) Prior Publication Data

US 2015/0144529 A1 May 28, 2015

(30) Foreign Application Priority Data

Nov. 28, 2013 (FR) .................... 13 61800

(51) Int. Cl.
| | | |
|---|---|---|
| *C10G 65/02* | (2006.01) | |
| *C10G 65/04* | (2006.01) | |
| *C10G 45/08* | (2006.01) | |
| *C10G 65/12* | (2006.01) | |
| *C10G 69/04* | (2006.01) | |
| *B01J 37/02* | (2006.01) | |
| *B01J 27/19* | (2006.01) | |
| *B01J 35/00* | (2006.01) | |
| *C10G 65/00* | (2006.01) | |

(52) U.S. Cl.
CPC .............. *C10G 65/04* (2013.01); *B01J 27/19* (2013.01); *B01J 35/002* (2013.01); *B01J 37/0203* (2013.01); *B01J 37/0207* (2013.01); *C10G 45/08* (2013.01); *C10G 65/12* (2013.01); *C10G 69/04* (2013.01); *C10G 2300/1074* (2013.01); *C10G 2300/202* (2013.01)

(58) Field of Classification Search
CPC ........ C10G 45/04; C10G 45/06; C10G 45/08; C10G 65/00; C10G 65/02; C10G 65/04
See application file for complete search history.

(56) References Cited

U.S. PATENT DOCUMENTS

| | | | |
|---|---|---|---|
| 4,574,120 A | 3/1986 | Thompson | |
| 5,389,595 A * | 2/1995 | Simpson | .................. B01J 23/85 502/211 |
| 6,235,190 B1 * | 5/2001 | Bertram | ................. C10G 65/12 208/58 |
| 8,288,305 B2 | 10/2012 | Bai et al. | |
| 2005/0247602 A1 | 11/2005 | Shih et al. | |
| 2010/0012554 A1 | 1/2010 | Bai et al. | |
| 2014/0076780 A1 * | 3/2014 | Guichard | ............... C10G 47/18 208/111.3 |

FOREIGN PATENT DOCUMENTS

| | | | | |
|---|---|---|---|---|
| FR | 2972648 | * | 9/2012 | ............. B01J 31/34 |
| WO | 2007/084438 A2 | | 7/2007 | |
| WO | 2008/045550 A1 | | 4/2008 | |

OTHER PUBLICATIONS

Speight, J.G. (1999). The Chemistry and Technology of Petroleum, $3^{rd}$ ed., Marcel-Dekker, 918 pgs.*
Search Report dated Mar. 13, 2014 issued in corresponding FR 1361800 application (pp. 1-2).

* cited by examiner

*Primary Examiner* — Brian McCaig
(74) *Attorney, Agent, or Firm* — Millen, White, Zelano, Branigan, P.C.

(57) ABSTRACT

A process for the hydrotreatment of a vacuum distillate type hydrocarbon feed containing nitrogen-containing compounds is described, comprising a first step in which the feed is brought into contact with a catalyst in its oxide form, then a second step in which the feed is brought into contact with a dried catalyst comprising at least one organic compound containing oxygen and/or nitrogen.

5 Claims, No Drawings

VACUUM DISTILLATE HYDROTREATMENT PROCESS EMPLOYING A CONCATENATION OF CATALYSTS

The present invention relates to the field of hydrocracking processes and catalytic cracking processes, and more particularly to a pre-treatment for processes of this type by hydrotreatment of a vacuum distillate type feed using a concatenation of catalysts. The aim of the process is to produce desulphurized and denitrogenated vacuum distillate. The hydrotreatment process of the invention is particularly suitable for the hydrotreatment of feeds comprising high levels of nitrogen.

The hydrocracking process can be used to convert oil fractions, in particular vacuum distillates (VD) into lighter products which are more upgradable (gasoline, middle distillates). Vacuum distillates contain varying quantities of various contaminants (sulphur-containing, nitrogen-containing compounds in particular): thus, it is necessary to carry out a step for hydrotreatment of the feed before the hydrocracking step proper which can be used to break C—C bonds and produce the intended light cuts. The same problem exists for a feed intended for a catalytic cracking process.

The aim of the hydrotreatment step, often termed hydrocracking pre-treatment, is to purify the feed without modifying the average molecular weight thereof too much. In particular, it is intended to eliminate the sulphur-containing or nitrogen-containing compounds contained therein. The principal reactions which are targeted are hydrodesulphurization, hydrodenitrogenation and hydrogenation of aromatics. The composition and the use of hydrotreatment catalysts have been thoroughly described in the article by B. S Clausen, H. T. Topsøe, and F. E. Massoth, published in Catalysis Science and Technology, volume 11 (1996), Springer-Verlag. The hydrotreatment catalysts generally have hydrodesulphurizing functions and hydrogenating functions based on a sulphide of metals from groups VIB and VIII.

Adding an organic compound to hydrotreatment catalysts to improve their activity is now well known to the skilled person. A number of patents protect the use of various ranges of organic compounds such as mono-, di- or poly-alcohols, which may be etherified (WO 96/41848, WO 01/76741, U.S. Pat. No. 4,012,340, U.S. Pat. No. 3,954,673, EP 0601722). Catalysts modified with C2-C14 monoesters are described in patent applications EP 466568 and EP 1046424.

Other patents show that a specific concatenation of catalysts in the same reactor may be advantageous.

Thus, patent application US 2011/0079542 discloses that replacement of a portion of a reference HDS catalyst at the head of the bed by a catalyst with a lower activity does not modify the performances of the overall charge compared with 100% reference catalyst, as over the same portion of catalytic bed, the reaction occurs on non-refractory sulphur-containing species and does not require a high performance catalyst.

Patent EP 0651041 discloses the advantage of linking together beds of catalysts with different particle shapes in a concatenation.

The present invention concerns a process for the hydrotreatment of a feed of the vacuum distillate type by using a specific concatenation of at least two different types of catalysts, which can increase the overall activity and overall stability of the hydrotreatment process compared with a hydrotreatment process using the same quantity and the same operating conditions as just one of these two types of catalysts.

The term "hydrotreatment" means reactions in particular encompassing hydrodesulphurization (HDS), hydrodenitrogenation (HDN) and hydrogenation of aromatics (HDA).

In accordance with the process of the invention, the feed is initially brought into contact with a first type of catalyst comprising phosphorus and an active phase in its oxide form, i.e. said first catalyst is prepared using a process comprising at least one calcining step after impregnation of metallic salts. This first type of catalyst is termed the "catalyst in the oxide form" or "calcined catalyst".

The feed is then brought into contact with a second type of catalyst which has been prepared by introducing phosphorus, active phase and an organic compound containing oxygen and/or nitrogen followed by a drying step, without subsequent calcining. It should be noted that this second type of catalyst does not undergo calcining, and so the active phase is not in its oxide form. This second type of catalyst is known as an "additive-containing catalyst".

More particularly, the present invention concerns a process for the hydrotreatment of a hydrocarbon feed containing nitrogen-containing compounds in an amount of more than 250 ppm by weight, preferably more than 500 ppm, and having a weighted average temperature of more than 380° C., comprising the following steps:

a) bringing said hydrocarbon feed into contact, in the presence of hydrogen, with at least one first catalyst comprising an amorphous support based on alumina, phosphorus, and an active phase formed by at least one metal from group VIB in the oxide form and at least one metal from group VIII in the oxide form, said first catalyst being prepared in accordance with a process comprising at least one calcining step;

b) bringing the effluent obtained in step a) into contact, in the presence of hydrogen, with at least one second catalyst comprising an amorphous support based on alumina, phosphorus, an active phase formed by at least one metal from group VIB and at least one metal from group VIII, and at least one organic compound containing oxygen and/or nitrogen, said second catalyst being prepared in accordance with a process comprising the following steps:

i) bringing at least one component of a metal from group VIB, at least one component of a metal from group VIII, phosphorus and at least one organic compound containing oxygen and/or nitrogen into contact with the support, so as to obtain a catalyst precursor;

ii) drying said catalyst precursor obtained from step i) at a temperature of less than 200° C., without subsequent calcining;

in order to obtain a hydrotreated effluent.

It has been observed that although the additive-containing catalysts of an organic compound generally have an improved hydrotreatment capability compared with catalysts without additives, these catalysts are easily inhibited by nitrogen-containing molecules, and in particular by basic nitrogen-containing molecules contained in the feed, than catalysts without additives. This inhibition has the consequence of reducing the activity and stability of the additive-containing catalyst over time, thus reducing their hydrotreatment capability.

The Applicant has developed a process for the hydrotreatment of a vacuum distillate type feed, comprising a concatenation of catalysts which can be used to carry out, firstly, hydrotreatment over a catalyst in its oxide form (calcined catalyst) which has a good hydrodesulphurization and hydrodenitrogenation activity. This first type of catalyst is in particular less inhibited by refractory basic nitrogen-containing molecules and thus more active in hydrodenitrogenation than an additive-containing catalyst. This means that intense hydrodenitrogenation can be carried out in the first step of the process of the invention and thus relieves the additive-containing catalyst of the second step which is brought into contact with the effluent leaving from this first step. The hydrotreatment is then continued by bringing the feed which has been freed from a large part of its nitrogen-containing molecules and a portion of its sulphur-containing molecules into contact with an additive-containing catalyst which is particularly active in HDN and HDS, thus allowing the hydrotreatment to be completed. Because the feed is brought into contact with a catalyst in the oxide form before being brought into contact with an additive-containing catalyst, the additive-containing catalyst is less inhibited by nitrogen-containing molecules and thus more active and stable over time. The specific concatenation can thus protect the additive-containing catalyst which is highly active for HDS/HDN with a catalyst in the oxide form which is highly active in HDN, which has the result of increasing the overall activity and overall stability of the catalytic concatenation compared with a catalytic system containing only additive-containing catalysts. Thus, the overall activity is increased as the hourly space velocity (volume of feed which can be treated per unit time) can be increased or, alternatively, less catalyst could be used to treat the same volume of feed. In addition, because of the increase in activity, the temperature necessary to obtain a desired nitrogen content can be reduced. Similarly, the overall stability is increased, as the cycle time is longer.

The hydrotreatment process of the invention is particularly suitable for the hydrotreatment of feeds comprising high organic nitrogen contents, such as feeds obtained from catalytic cracking, from a coker or from visbreaking.

The process of the present invention can be used to produce a hydrotreated hydrocarbon cut, i.e. free of both sulphur-containing and nitrogen-containing compounds. The quantities of nitrogen-containing compounds after hydrotreatment are generally 300 ppm of nitrogen or less, preferably less than 200 ppm, highly preferably less than 100 ppm. The term "ppm of nitrogen (or sulphur)" when used in the remainder of the text means ppm by weight with respect to the elemental nitrogen (or elemental sulphur), irrespective of the organic molecule or molecules in which the nitrogen (or sulphur) is engaged. Preferably, in the process of the invention, the hydrodesulphurization conversion is more than 95%, preferably more than 98%. Preferably, in the process of the invention, the hydrodesulphurization conversion is more than 90%, preferably more than 95%.

In a variation, for the catalyst of step a) or b), the metal from group VIB is selected from molybdenum, tungsten and a mixture of these two elements, and the metal from group VIII is selected from cobalt, nickel and a mixture of these two elements.

In a variation, for the catalyst of step a) or b), the quantity of metal from group VIB is in the range 5% to 40% by weight of oxide of the metal from group VIB with respect to the total catalyst weight, the quantity of metal from group VIII is in the range 1% to 10% by weight of oxide of the metal from group VIII with respect to the total catalyst weight, and the quantity of phosphorus is in the range 0.1% to 10% by weight of $P_2O_5$ with respect to the total catalyst weight.

In a variation, the catalyst of step a) or b) further contains at least one dopant selected from boron and fluorine and a mixture of boron and fluorine.

In a variation, the organic compound is one or more selected from a carboxylic acid, an alcohol, an aldehyde, an ester, an amine, an aminocarboxylic acid, an aminoalcohol, a nitrile or an amide, preferably one or more selected from ethylene glycol, glycerol, polyethylene glycol (with a molecular weight of 200 to 1500), acetophenone, 2,4-pentanedione, pentanole, acetic acid, maleic acid, oxalic acid, tartaric acid, formic acid, citric acid and C1-C4 dialkyl succinate; particularly preferably, it comprises at least the combination of C1-C4 dialkyl succinate and acetic acid. In accordance with another particularly preferred variation, the organic compound comprises at least citric acid.

In a variation, the catalyst of step a) or b) has also undergone a sulphurizing step. In a variation, the quantity of basic nitrogen in the feed is 60 ppm or more.

In a variation, each of steps a) and b) is carried out at a temperature in the range 200° C. to 450° C., at a pressure in the range 0.5 to 30 MPa, at an hourly space velocity in the range 0.1 to 20 h$^{-1}$ and with a hydrogen/feed ratio, expressed as the volume of hydrogen measured under normal temperature and pressure conditions, per volume of liquid feed is advantageously in the range 50 L/L to 2000 L/L.

In a variation, step a) is carried out in a first zone containing the first catalyst which occupies a volume V1, and step b) is carried out in a second zone containing the second catalyst which occupies a volume V2, the distribution of the volumes, V1/V2, being in the range 10% by volume/90% by volume to 50% by volume/50% by volume respectively for the first and second zone.

In a variation, step i) of step b) comprises the following steps in succession:

i') impregnating an amorphous support based on alumina with at least one solution containing at least one metal from group VIB, at least one metal from group VIII and said phosphorus in order to obtain an impregnated support;

i'') drying the impregnated support obtained in step i') at a temperature of less than 180° C. without subsequent calcining in order to obtain a dried impregnated support;

i''') impregnating the dried impregnated support obtained in step i'') with an impregnation solution comprising at least one organic compound containing oxygen and/or nitrogen in order to obtain an impregnated catalytic precursor;

i'''') allowing the impregnated catalytic precursor obtained in step i''') to mature, in order to obtain said catalyst precursor.

In a variation, the effluent obtained in step a) undergoes a separation step in order to separate a heavy fraction and a light fraction containing the $H_2S$ and $NH_3$ formed during step a), said heavy fraction then being introduced into step b).

The invention also concerns a hydrocracking process employing the hydrotreatment process of the invention, in which said hydrotreated effluent is brought into contact, in the presence of hydrogen and under hydrocracking operating conditions, with at least one hydrocracking catalyst so as to obtain a hydrocracked effluent.

The invention also concerns a fluidized bed catalytic cracking process employing the hydrotreatment process of the invention, in which said hydrotreated effluent is brought into contact, under catalytic cracking operating conditions, with at least one catalytic cracking catalyst so as to obtain a cracked effluent.

DETAILED DESCRIPTION

The Feed and the Operating Conditions

The hydrocarbon feed treated in accordance with the hydrotreatment process of the invention has a weighted average temperature (WAT) of more than 380° C. The WAT is defined from the temperature at which 5%, 50% and 70% of the volume of the feed distils in accordance with the following formula: WAT=(T 5%)+2×T 50%+4×T 70%)/7. The WAT is calculated from simulated distillation values. The WAT of the feed is more than 380° C. and preferably less than 600° C., more preferably less than 580° C. The treated hydrocarbon feed generally has a distillation range in the range 250° C. to 600° C., preferably in the range 300° C. to 580° C.

In the remainder of the text, we shall use the convention of calling this feed a vacuum distillate, but this designation is not at all restrictive in nature. Any hydrocarbon feed containing sulphur and nitrogen-containing compounds which are hydrotreatment inhibitors, and a WAT similar to that of a vacuum distillate cut may be used in the process of the present invention. The hydrocarbon feed may have any chemical nature, i.e. it may have any distribution of chemical families, in particular paraffins, olefins, naphthenes and aromatics.

Said hydrocarbon feed comprises organic nitrogen-containing and/or sulphur-containing molecules. The nitrogen-containing organic molecules are either basic, such as amines, anilines, pyridines, acridines, quinolines and their derivatives, or neutral, such as pyrroles, indoles, carbazoles and their derivatives, for example. In particular, it is the basic nitrogen-containing molecules which inhibit the hydrotreatment catalysts, and in particular the additive-containing catalysts.

The nitrogen content is 250 ppm or more, and is preferably in the range 500 to 10000 ppm by weight, more preferably in the range 700 to 4000 ppm by weight and still more preferably in the range 1000 to 4000 ppm. The basic nitrogen content is at least a quarter of the overall nitrogen content (nitrogen). The basic nitrogen content is generally 60 ppm or higher, more preferably in the range 175 to 1000 ppm by weight and still more preferably in the range 250 to 1000 ppm.

The sulphur content in the feed is generally in the range 0.01% to 5% by weight, preferably in the range 0.2% to 4% by weight and more preferably in the range 0.5% to 3% by weight.

Said hydrocarbon feed may advantageously optionally contain metals, in particular nickel and vanadium. The cumulative nickel and vanadium content of said hydrocarbon feed treated using the hydrocracking process of the invention is preferably less than 1 ppm by weight.

The asphaltenes content of said hydrocarbon feed is generally less than 3000 ppm, preferably less than 1000 ppm, and more preferably less than 200 ppm.

The treated feed generally contains resins; preferably, the resins content is more than 1% by weight, preferably more than 5% by weight. The resins content is measured in accordance with ASTM standard D 2007-11.

Said hydrocarbon feed is advantageously selected from LCO or HCO (Light Cycle Oil or Heavy Cycle Oil) (light or heavy diesels obtained from a catalytic cracking unit), vacuum distillates, for example diesels obtained from straight-run distillation of crude or from conversion units such as catalytic cracking, cokers or visbreaking units, feeds obtained from aromatics extraction units, lube base oils or obtained from solvent dewaxing lube base oils, distillates obtained from processes for fixed bed or ebullated bed desulphurization or hydroconversion of atmospheric residues and/or vacuum residues and/or deasphalted oils, or indeed the feed may be a deasphalted oil or comprise vegetable oils or may derive from the conversion of feeds obtained from biomass. Said hydrocarbon feed treated in accordance with the hydrocracking process of the invention may also be a mixture of said feeds as mentioned above.

The process of the invention may be carried out in one, two or more reactors. It is generally carried out in fixed bed mode.

When the process of the invention is carried out in two reactors, step a) may be carried out in the first reactor traversed by the feed, then step b) may be carried out in the second reactor placed downstream of the first reactor. Optionally, the effluent from step a) leaving the first reactor may undergo a separation step in order to separate a light fraction containing $H_2S$ and $NH_3$ in particular, formed during the hydrotreatment, in step a), from a heavy fraction containing partially hydrotreated hydrocarbons. The heavy fraction obtained after the separation step is then introduced into the second reactor for carrying out step b) of the process of the invention. The separation step may be carried out by distillation, flash separation or any other method which is known to the skilled person.

When the process is carried out in a single reactor, step a) is carried out in a first zone containing the first catalyst which occupies a volume V1, and step b) is carried out in a second zone containing the second catalyst which occupies a volume V2. The percentage by volume of the first zone containing the catalyst in the oxide form of step a) with respect to the total volume of the zones is preferably at least 10% by volume. The percentage by volume of the first zone containing the catalyst in the oxide form of step a) is adjusted so as to maximize the conversion of the inhibiting nitrogen-containing compounds, termed basic compounds. The distribution of the volumes, V1/V2, is preferably in the range 10% by volume/90% by volume to 50% by volume/50% by volume in the first and second zone respectively.

The metals from group VIB or group VIII used to form the active phase of the catalysts of step a) or b) may be identical or different in each of steps a) or b).

The operating conditions used in steps a) or b) of the hydrotreatment process of the invention are generally as follows: the temperature is advantageously in the range 200° C. to 450° C., preferably in the range 300° C. to 400° C., the pressure is advantageously in the range 0.5 to 30 MPa, preferably in the range 5 to 20 MPa, the hourly space velocity (defined as the ratio of the volume flow rate of feed to the volume of catalyst per hour) is advantageously in the range 0.1 to 20 $h^{-1}$, preferably in the range 0.2 to 5 $h^{-1}$, and the hydrogen/feed ratio, expressed as the volume of hydrogen, measured under normal temperature and pressure conditions, per volume of liquid feed, is advantageously in the range 50 L/L to 2000 L/L. The operating conditions in steps a) and b) may be identical or different. Preferably, they are identical.

Step a): Hydrotreatment with a Catalyst in the Oxide Form

In step a) of the process of the invention, said hydrocarbon feed is brought into contact, in the presence of hydrogen, with at least a first catalyst comprising an amorphous support based on alumina, phosphorus and an active phase formed by at least one metal from group VIB in the oxide form and at least one metal from group VIII in the oxide form, said first catalyst being prepared using a process comprising at least one calcining step.

The catalyst used in step a) of the invention is composed of an amorphous support based on alumina, phosphorus and an active phase formed by at least one metal from group VIB in the oxide form and at least one metal from group VIII in the oxide form.

In general, the total quantity of metal from group VIB and metal from group VIII is more than 6% by weight, preferably in the range 10% to 50% by weight of oxides of metals from groups VIB and VIII with respect to the total catalyst weight.

The quantity of metal from group VIB is in the range 5% to 40% by weight, preferably in the range 8% to 35% by weight, and more preferably in the range 10% to 30% by weight of oxide of metal(s) from group VIB with respect to the total catalyst weight.

The quantity of metal from group VIII is in the range 1% to 10% by weight, preferably in the range 1.5% to 9% by weight, and more preferably in the range 2% to 8% by weight of oxide of metal from group VIII with respect to the total catalyst weight.

The metal from group VIB present in the active phase of the catalyst used in the hydrotreatment process of the invention is preferably selected from molybdenum, tungsten and a mixture of these two elements; highly preferably, the metal from group VIB is molybdenum.

The metal from group VIII present in the active phase of the catalyst used in the hydrotreatment process of the invention is preferably selected from cobalt, nickel and a mixture of these two elements. Highly preferably, the metal from group VIII is nickel.

Preferably, the active phase of the catalyst used in step a) is selected from the group formed by a combination of elements: nickel-molybdenum, nickel-cobalt-molybdenum, nickel-tungsten or nickel-molybdenum-tungsten. Highly preferably, the active phase of the catalyst used in step a) is a combination of the elements nickel and molybdenum.

The molar ratio of the metal from group VIII to the metal from group VIB in the catalyst in the oxide form is preferably in the range 0.1 to 0.8, preferably in the range 0.15 to 0.6, and more preferably in the range 0.2 to 0.5.

Said catalyst of step a) also comprises phosphorus as a dopant. The dopant is an element which is added which in itself does not have any catalytic character, but which increases the catalytic activity of the active phase.

The quantity of phosphorus in said catalyst for step a) is preferably in the range 0.1% to 10% by weight of $P_2O_5$, preferably in the range 0.2% to 8% by weight of $P_2O_5$, more preferably in the range 0.3% to 8% by weight of $P_2O_5$.

The molar ratio of phosphorus to metal from group VIB in the catalyst for said step a) is 0.05 or more, preferably 0.07 or more, more preferably in the range 0.08 to 0.5.

The catalyst used in step a) of the invention may advantageously further contain at least one dopant selected from boron and fluorine and a mixture of boron and fluorine.

When the hydrotreatment catalyst contains boron as the dopant, the boron content in said catalyst in the oxide form of said step a) is preferably in the range 0.1% to 10% by weight of boron oxide, preferably in the range 0.2% to 7% by weight of boron oxide, highly preferably in the range 0.2% to 5% by weight of boron oxide.

When the hydrotreatment catalyst contains fluorine as the dopant, the fluorine content in said catalyst in the oxide form obtained from said step a) is preferably in the range 0.1% to 10% by weight of fluorine, preferably in the range 0.2% to 7% by weight of fluorine, highly preferably in the range 0.2% to 5% by weight of fluorine.

The amorphous support for said catalytic precursor is based on alumina, i.e. it contains more than 50% alumina, and generally it contains only alumina or silica-alumina as will be defined hereinbelow—and optionally metals and/or dopant(s), which have been introduced separately from the impregnations (for example introduced during preparation (mixing, peptizing etc.) of the support or its shaping). The support is obtained after shaping (for example by extrusion) and calcining, in general between 300° C. and 600° C.

In a preferred case, the amorphous support is an alumina, preferably an extruded alumina. Preferably, the alumina is gamma alumina. Particularly preferably, the support is constituted by an alumina, preferably a gamma alumina.

In another preferred case, the amorphous support is a silica-alumina containing at least 50% alumina. The silica content in the support is at most 50% by weight, usually 45% by weight or less, preferably 40% by weight or less. Particularly preferably, the support is constituted by a silica-alumina.

The pore volume of the amorphous support is generally in the range 0.1 $cm^3/g$ to 1.5 $cm^3/g$, preferably in the range 0.4 $cm^3/g$ to 1.1 $cm^3/g$. The total pore volume is measured by mercury porosimetry in accordance with ASTM standard D 4284-92 with a wetting angle of 140°, as described in the work by Rouquerol. F.; Rouquerol J.; Singh K. "Adsorption by Powders & Porous Solids: Principle, methodology and applications", Academic Press, 1999, for example using an instrument from the firm Microméritics™, model Autopore III™.

The specific surface area of the amorphous support is generally in the range 5 $m^2/g$ to 350 $m^2/g$, preferably in the range 10 $m^2/g$ to 300 $m^2/g$. The specific surface area is determined in the present invention by the BET method, which method is described in the work which is cited above.

Said amorphous support is advantageously in the powder form or is shaped into beads, extrudates, pellets, or irregular and non-spherical agglomerates the specific shape of which may be the result of a crushing step. Highly advantageously, said support is in the form of extrudates.

A fresh catalyst in the oxide form used in step a) may be prepared using any method which is well known to the skilled person.

The metals from group VIB and from group VIII of said catalyst may advantageously be introduced into the catalyst at various stages of the preparation and in a variety of manners. Said metals from group VIB and from group VIII may advantageously be introduced in part during shaping of said amorphous support or, as is preferable, after said shaping.

In the case in which the metals from group VIB and from group VIII are introduced in part during shaping of said amorphous support, they may be introduced in part only at the time of mixing with an alumina gel selected as the matrix, the remainder of the metals then being introduced subsequently. Preferably, when the metals from group VIB and from group VIII are introduced in part at the time of mixing, the proportion of metal from group VIB introduced during this step is 20% or less of the total quantity of metal from group VIB introduced onto the final catalyst and the proportion of metal from group VIII introduced during this step is 50% or less of the total quantity of metal from group VIII introduced onto the final catalyst. In the case in which the metals from group VIB and from group VIII are introduced at least in part and preferably in their entirety after shaping said amorphous support, the metals from group VIB and from group VIII may advantageously be introduced onto the amorphous support by means of one or more excess solution impregnations onto the amorphous support or, as is preferable, by one or more dry impregnations, preferably a single dry impregnation of said amorphous support, with the aid of aqueous or organic solutions containing precursors of the metals. Dry impregnation consists of bringing the support into contact with a solution containing at least one precursor of said metal (metals) from group VIB and/or from group VIII, the volume of which is equal to the pore volume of the support to be impregnated. The solvent for the impregnation solution may be water or an organic compound such as an alcohol. Preferably, an aqueous solution is used as the impregnation solution.

Highly preferably, the metals from group VIB and from group VIII are introduced in their entirety after shaping said amorphous support, by dry impregnation of said support with the aid of an aqueous impregnation solution containing precursor salts of the metals. The metals from group VIB and from group VIII may also advantageously be introduced by one or more impregnations of the amorphous support, using a solution containing precursor salts of the metals. In the case in which the metals are introduced in a plurality of impregnations of the corresponding precursor salts, an intermediate step for drying the catalyst is generally carried out at a temperature in the range 50° C. to 180° C., preferably in the range 60° C. to 150° C. and highly preferably in the range 75° C. to 130° C.

Preferably, the metal from group VIB is introduced at the same time as the metal from group VIII, irrespective of the mode of introduction.

The molybdenum precursors which may be used are well known to the skilled person. As an example, from among the molybdenum sources, it is possible to use oxides and hydroxides, molybdic acids and their salts, in particular ammonium salts such as ammonium molybdate, ammonium heptamolybdate, phosphomolybdic acid ($H_3PMo_{12}O_{40}$), and their salts, and optionally silicomolybdic acid ($H_4SiMo_{12}O_{40}$) and its salts. The molybdenum sources may also be any heteropolycompound of the Keggin, lacunary Keggin, substituted Keggin, Dawson, Anderson or Strandberg type, for example. Preferably, molybdenum trioxide and heteropolycompounds of the Keggin, lacunary Keggin, substituted Keggin and Strandberg type are used.

The tungsten precursors which may be used are also well known to the skilled person. As an example, from among the tungsten sources, it is possible to use oxides and hydroxides, tungstic acids and their salts, in particular ammonium salts such as ammonium tungstate, ammonium metatungstate, phosphotungstic acid and their salts, and optionally silicotungstic acid ($H_4SiW_{12}O_{40}$) and its salts. The sources of tungsten may also be any heteropolycompound of the Keggin, lacunary Keggin, substituted Keggin or Dawson type, for example. Preferably, oxides and ammonium salts such as ammonium metatungstate or heteropolyanions of the Keggin, lacunary Keggin or substituted Keggin are used.

The cobalt precursors which may be used are advantageously selected from oxides, hydroxides, hydroxycarbonates, carbonates and nitrates, for example. Cobalt hydroxide and cobalt hydroxycarbonate are preferably used.

The nickel precursors which may be used are advantageously selected from oxides, hydroxides, hydroxycarbonates, carbonates and nitrates, for example. Nickel oxyhydroxide and nickel carbonate are preferably used.

In the same manner, the phosphorus may advantageously be introduced into the catalyst at various stages in the preparation and in a variety of manners. Said phosphorus may advantageously be introduced during shaping of said amorphous support or, as is preferable, after shaping it. It may, for example, be introduced just before or just after peptizing the selected matrix such as, for example and preferably, the aluminium oxyhydroxide (boehmite) precursor of alumina. It may also advantageously be introduced alone or as a mixture with at least one of the metals from group VIB and VIII.

Said phosphorus is preferably introduced as a mixture with the precursors of the metals from group VIB and group VIII, in its entirety or in part onto the shaped amorphous support, preferably alumina or silica-alumina in the extruded form, by dry impregnation of said amorphous support using a solution containing precursors of the metals and the phosphorus precursor.

The preferred source of phosphorus is orthophosphoric acid, $H_3PO_4$, but salts and esters such as ammonium phosphates are also suitable. The phosphorus may also be introduced at the same time as the group VIB element(s) in the form of Keggin, lacunary Keggin, substituted Keggin or Strandberg type heteropolyanions.

The catalyst used in step a) of the invention may advantageously further contain at least one dopant selected from boron and fluorine and a mixture of boron and fluorine. This dopant may be introduced in the same manner as that for the phosphorus at various stages in the preparation and in a variety of manners. It may be introduced at least in part during the preparation of the support (including shaping). It may advantageously be introduced alone or as a mixture with the phosphorus or at least one of the precursors of the metals from groups VIB and VIII. It is preferably introduced as a mixture with the precursors of the metals from group VIB and from group VIII and phosphorus, in its entirety or in part onto the shaped amorphous support, preferably alumina or silica-alumina in the extruded form, by dry impregnation of said amorphous support using a solution containing precursors of the metals, the phosphorus precursor and the precursor(s) of the dopant being selected from boron and/or fluorine.

The source of boron may be boric acid, preferably orthoboric acid $H_3BO_3$, ammonium biborate or pentaborate, boron oxide, or boric esters. The boron may, for example, be introduced by means of a solution of boric acid in a water/alcohol mixture or into a water/ethanolamine mixture.

The sources of fluorine which may be used are well known to the skilled person. As an example, the fluoride anions may be introduced in the form of hydrofluoric acid or its salts. These salts are formed with alkali metals, ammonium or an organic compound. In this latter case, the salt is advantageously formed in the reaction mixture by reaction between the organic compound and hydrofluoric acid. The fluorine may, for example, be introduced by impregnation of an aqueous solution of hydrofluoric acid or ammonium fluoride, or indeed ammonium bifluoride.

In a preferred mode, the process for the preparation of the catalyst of step a) of the process of the invention comprises the following steps:

a') impregnating a solution containing at least one precursor of a metal from group VIB, at least one precursor of a metal from group VIII, phosphorus, optionally another dopant selected from boron and/or fluorine, onto an amorphous support based on alumina;

a") optionally, drying the impregnated support obtained from step a');

a'") calcining the impregnated and optionally dried support so as to transform the precursors of the metals from group VIB and from group VIII into oxides.

Impregnation step a') is carried out in accordance with the variations described above. Highly preferably, the metals from group VIB and from group VIII, the phosphorus and optional other dopant selected from boron and/or fluorine are introduced in their entirety after shaping said amorphous support, by dry impregnation of said support with the aid of an aqueous impregnation solution containing precursor salts of the metals, phosphorus and optional dopant selected from boron and/or fluorine.

The drying of step a") is generally carried out at a temperature in the range 50° C. to 180° C., preferably in the range 60° C. to 150° C. and highly preferably in the range 75° C. to 130° C. Drying is generally carried out for a period in the range 1 to 24 hours, preferably in the range 1 to 20 hours. Drying is carried out in air, or under an inert atmosphere (for example nitrogen).

The calcining of step a''') is generally carried out at a temperature in the range 250° C. to 900° C., preferably in the range 350° C. to 750° C. The calcining period is generally in the range 0.5 hours to 16 hours, preferably in the range 1 hour to 5 hours. It is generally carried out in air. Calcining can be used to transform the precursors of the metals from groups VIB and VIII into oxides.

Before using it, it is advantageous to transform the catalyst in the oxide form (calcined) used in step a) of the process of the invention into a sulphurized catalyst in order to form its active species. This activation or sulphurization phase is carried out using methods which are well known to the skilled person, advantageously in a sulpho-reducing atmosphere in the presence of hydrogen and hydrogen sulphide.

This transformation into a sulphurized catalyst is preferably carried out on all types of catalyst in the oxide form, i.e. whether they are carried out on a fresh catalyst or on a regenerated catalyst.

The sulphurization step is advantageously carried out in an ex situ or in situ manner. The sulphurizing agents are $H_2S$ gas or any other compound containing sulphur used for activation of hydrocarbon feeds with a view to sulphurizing the catalyst. Said compounds containing sulphur are advantageously selected from alkyldisulphides such as, for example, dimethyldisulphide (DMDS), alkylsulphides such as, for example dimethyl sulphide, n-butylmercaptan, polysulphide compounds of the tertiononoylpolysulphide type, or any other compound which is known to the skilled person and can result in good sulphurization of the catalyst. Preferably, the catalyst is sulphurized in situ in the presence of a sulphurizing agent and a hydrocarbon feed. Highly preferably, the catalyst is sulphurized in situ in the presence of a hydrocarbon feed supplemented with dimethyldisulphide.

Step b): Hydrotreatment with an Additive-Containing Catalyst

In accordance with step b) of the process of the invention, the effluent obtained from step a) is brought into contact, in the presence of hydrogen, with at least a second catalyst comprising an amorphous support based on alumina, phosphorus, an active phase formed by at least one metal from group VIB and at least one metal from group VIII and at least one organic compound containing oxygen and/or nitrogen, said second catalyst being prepared in accordance with a process comprising the following steps:

i) bringing at least one component of a metal from group VIB, at least one component of a metal from group VIII, phosphorus and at least one organic compound containing oxygen and/or nitrogen into contact with the support, in order to obtain a catalyst precursor;

ii) drying said catalyst precursor obtained from step i) at a temperature of less than 200° C., without subsequent calcining thereof.

The catalyst used in step b) of the invention is composed of an amorphous support based on alumina, phosphorus, an active phase formed by at least one metal from group VIB and at least one metal from group VIII, and an organic compound containing oxygen or nitrogen. The catalyst used in step b) is a catalyst termed an additive-containing catalyst. During its preparation, it does not undergo calcining, i.e. its active phase comprises metals from groups VIB and VIII which have not been transformed into the oxide form.

The total quantity of metal from group VIII and metal from group VIB as well as the molar ratio of the metal from group VIII to the metal from group VIB of the catalyst of step b) are in the same ranges as those described for the catalyst of step a).

The metal from group VIB present in the active phase of the catalyst used in step b) of the invention is preferably selected from molybdenum, tungsten and a mixture of these two elements; highly preferably, the metal from group VIB is molybdenum.

The metal from group VIII present in the active phase of the catalyst used in step b) of the invention is preferably selected from cobalt, nickel and a mixture of these two elements. Particularly preferably, the metal from group VIII is nickel.

Preferably, the active phase of the catalyst used in step b) is selected from the group formed by the following combinations of elements: nickel-molybdenum, cobalt-molybdenum and nickel-cobalt-molybdenum. Particularly preferably, the active phase is constituted by nickel-molybdenum.

The additive-containing catalyst used in step b) also comprises phosphorus as the dopant. The phosphorus content of the catalyst of step b) as well as the molar ratio of phosphorus to the metal from group VIB of the catalyst of step b) are in the same ranges as those described for the catalyst of step a).

The catalyst used in step b) of the invention may advantageously further contain at least one dopant selected from boron and/or fluorine. When the catalyst used in step b) contains boron and/or fluorine, the quantities of boron and/or fluorine are in the same ranges as those described for the catalyst of step a).

The amorphous support for said catalyst used in step b) is based on alumina. It was described in the section pertaining to step a). The support for the additive-containing catalyst of step b) may be identical to or different from the support of the catalyst used in step a).

The catalyst used in step b) further contains an organic compound containing oxygen and/or nitrogen. This compound is an organic compound containing more than 2 carbon atoms and at least one oxygen and/or nitrogen atom.

The organic compound containing oxygen may be one or more compounds selected from a carboxylic acid, an alcohol, an aldehyde or an ester. By way of example, the organic compound containing oxygen may be one or more compounds selected from the group constituted by ethylene glycol, glycerol, polyethylene glycol (with a molecular weight of 200 to 1500), acetophenone, 2,4-pentanedione, pentanole, acetic acid, maleic acid, oxalic acid, tartaric acid, formic acid, citric acid and C1-C4 dialkyl succinate. The dialkyl succinate used is preferably included in the group composed of dimethyl succinate, diethyl succinate, dipropyl succinate and dibutyl succinate. Preferably, the C1-C4 dialkyl succinate used is dimethyl succinate or diethyl succinate. Highly preferably, the C1-C4 dialkyl succinate used is dimethyl succinate. At least one C1-C4 dialkyl succinate is used, preferably only one, and preferably dimethyl succinate.

The organic compound containing nitrogen may be selected from an amine. By way of example, the organic compound containing nitrogen may be ethylene diamine or tetramethylurea.

The organic compound containing oxygen and nitrogen may be selected from an aminocarboxylic acid, an aminoalcohol, a nitrile or an amide. By way of example, the organic compound containing oxygen and nitrogen may be aminotriacetic acid, 1,2-cyclohexanediaminetetraacetic acid, mono-ethanolamine, acetonitrile, N-methylpyrrolidone, dimethylformamide or EDTA.

Preferably, the organic compound contains oxygen. Particularly preferably, the organic compound comprises at least the combination of C1-C4 dialkyl succinate, in particular dimethyl, and acetic acid. In accordance with another particularly preferred variation, the organic compound comprises at least citric acid.

The catalyst used in step b) is prepared in accordance with a process comprising the following steps:

i) bringing at least one component of a metal from group VIB, at least one component of a metal from group VIII, phosphorus and at least one organic compound containing oxygen and/or nitrogen into contact with the support, in order to obtain a catalyst precursor;

ii) drying said catalyst precursor obtained from step i) at a temperature of less than 200° C., without subsequent calcining thereof.

Contact step i) can be implemented in a number of manners. In accordance with the first implementation of step i) of the process for the preparation of the catalyst used in step b), said components of the metals from group VIB and of group VIII, phosphorus and that of said organic compound are deposited on said support by at least one co-impregnation step, preferably by dry impregnation. In accordance with this implementation, also known as "co-impregnation", said components of the metals from groups VIB and group VIII, phosphorus and the organic compound are simultaneously introduced onto said support. Said first embodiment of step i) comprises carrying out one or more co-impregnation steps, each co-impregnation step preferably being followed by a drying step as described in step i") below.

In accordance with the second embodiment of step i) of the process for the preparation of the catalyst used in step b), at least one catalytic precursor comprising at least one metal from group VIII, at least one metal from group VIB, said phosphorus and at least said amorphous support based on alumina are brought into contact with at least one organic compound containing oxygen and/or nitrogen. In accordance with the invention, said second embodiment is a preparation known as "post-impregnation". In accordance with this variation, the catalyst precursor is prepared by depositing at least one component of a metal from group VIB and at least one component of a metal from group VIII and phosphorus on said support using any method known to the skilled person, preferably by dry impregnation, excess impregnation or by deposition-precipitation using methods which are well known to the skilled person. The components of the metals from group VIB and VIII and phosphorus may be deposited by one or more impregnations, preferably followed by a drying step as described in step i") below.

In accordance with a particularly preferred variation, the contact of step i) is carried out in accordance with the second embodiment of step i), i.e. by post-impregnation. In a particularly preferred variation, the catalyst used in step b) is prepared in accordance with the preparation process described in US 2013/008829. More precisely, step i) of the process for the preparation of the catalyst of step b) may comprise the following steps in succession which will be described in more detail below:

i') impregnating an amorphous support based on alumina with at least one solution containing at least one metal from group VIB, at least one metal from group VIII and said phosphorus in order to obtain an impregnated support;

i") drying the impregnated support obtained in step i') at a temperature of less than 180° C. without subsequent calcining, in order to obtain a dried impregnated support;

i'") impregnating the dried impregnated support obtained in step i") with an impregnation solution comprising at least one organic compound containing oxygen and/or nitrogen in order to obtain an impregnated catalytic precursor;

i"") allowing the impregnated catalytic precursor obtained in step i'") to mature, in order to obtain said catalyst precursor.

In step i'), the metals from group VIB and from group VIII may advantageously be introduced onto the amorphous support by one or more excess solution impregnations, or preferably by one or more dry impregnations and more preferably by a dry impregnation of said amorphous support, using an aqueous or organic solution containing precursors of the metals. The impregnation step may be carried out in the same manner as that described for the preparation of the catalyst in the oxide form described in step a). The precursors of the metal from group VIB and from group VIII are those described for step a). Said phosphorus and the optional other dopant selected from boron and/or fluorine may be introduced in the manner described in step a). The phosphorus, boron and fluorine precursors are those described in step a).

Introduction of the metals from group VIB and from group VIII and phosphorus into or onto the amorphous support is then advantageously followed by a step i") for drying, during which the solvent (which is generally water) is eliminated, at a temperature in the range 50° C. to 180° C., preferably in the range 60° C. to 150° C. or in the range 65° C. to 145° C., and highly preferably in the range 70° C. to 140° C. or in the range 75° C. to 130° C. The step for drying the dried impregnated support obtained thereby is never followed by a step for calcining in air at a temperature of more than 200° C.

Preferably, in step i'), said impregnated support is obtained by dry impregnation of a solution comprising precursors of metals from group VIB and from group VIII, and phosphorus onto an amorphous support based on alumina which has been calcined and shaped, followed by drying at a temperature of less than 180° C., preferably in the range 50° C. to 180° C., preferably in the range 60° C. to 150° C. and highly preferably in the range 75° C. to 130° C. A dried impregnated support is thus obtained at the end of step i").

In accordance with step i'"), said dried impregnated support is impregnated with an impregnation solution comprising at least one organic compound containing oxygen and/or nitrogen, preferably the C1-C4 dialkyl succinate (and in particular dimethyl succinate) and acetic acid. In another variation, the impregnation solution of step i'") preferably comprises citric acid. The impregnation solution comprising at least said organic compound is preferably an aqueous solution.

The molar ratio of the organic compound(s) containing oxygen and/or nitrogen over the impregnated element(s) from group VIB of the catalytic precursor engaged on the catalyst is in the range 0.05 to 2 mol/mol, preferably in the range 0.1 to 1.8 mol/mol, preferably in the range 0.15 to 1.5 mol/mol before the drying of step ii). When the organic component is a mixture of C1-C4 dialkyl succinate (and in particular dimethyl succinate) and acetic acid, said components are advantageously introduced into the impregnation solution of step i''') of the process of the invention in a quantity corresponding to:
- a molar ratio of dialkyl succinate (for example dimethyl) to impregnated element(s) from group VIB of the catalytic precursor in the range 0.05 to 2 mol/mol, preferably in the range 0.1 to 1.8 mol/mol, more preferably in the range 0.15 to 1.5 mol/mol;
- a molar ratio of acetic acid to impregnated element(s) from group VIB of the catalytic precursor in the range 0.1 to 5 mol/mol, preferably in the range 0.5 to 4 mol/mol, more preferably in the range 1.3 to 3 mol/mol and highly preferably in the range 1.5 to 2.5 mol/mol.

Said organic compound(s) may advantageously be deposited in one or more steps, either by slurry impregnation or by excess impregnation or by dry impregnation, or by any other means which is known to the skilled person.

In accordance with step i'''), the organic compound containing oxygen or nitrogen is introduced onto the dried impregnated support by at least one impregnation step, preferably by a single step for impregnation of an impregnation solution onto said dried catalytic precursor, particularly preferably by a single dry impregnation step.

In accordance with step i'''') of the preparation process of the invention, the impregnated catalytic precursor obtained from step i''') undergoes a maturation step. It is advantageously carried out at atmospheric pressure and at a temperature in the range 17° C. to 50° C., and generally a maturation period in the range ten minutes to forty-eight hours, preferably in the range thirty minutes to five hours is sufficient. Longer times are not excluded. A catalyst precursor is thus obtained at the end of step i'''').

In accordance with step ii) of the preparation process of the invention, the catalyst precursor obtained from step i) undergoes a drying step at a temperature below 200° C., without subsequently calcining it.

The drying step ii) of the process of the invention is advantageously carried out using any technique which is known to the skilled person. It is advantageously carried out at atmospheric pressure or under reduced pressure. Preferably, this step is carried out at atmospheric pressure.

This step ii) is advantageously carried out at a temperature in the range 50° C. to less than 200° C., preferably in the range 60° C. to 180° C. and highly preferably in the range 80° C. to 160° C.

Step ii) is advantageously carried out in a flushed bed using air or any other hot gas. Preferably, when drying is carried out in a fixed bed, the gas used is either air or an inert gas such as argon or nitrogen. Highly preferably, drying is carried out in a flushed bed in the presence of nitrogen.

Preferably, this step lasts in the range 30 minutes to 4 hours, preferably in the range 1 hour to 3 hours.

At the end of step ii) of the process of the invention, a dry catalyst is obtained which is also known as the "additive-containing catalyst", which does not undergo any subsequent calcining step in air, for example at a temperature of more than 200° C.

Before using it, it is advantageous to transform the additive-containing catalyst used in step b) into a sulphurized catalyst in order to form its active species. This activation or sulphurization phase is carried out using methods which are well known to the skilled person, and advantageously in a sulpho-reductive atmosphere in the presence of hydrogen and hydrogen sulphide.

At the end of step ii) of the process of the invention, said additive-containing catalyst obtained thus advantageously undergoes a sulphurizing step iii), without an intermediate calcining step.

Said additive-containing catalyst is advantageously sulphurized ex situ or in situ. The same sulphurization agents as those described for the catalyst in the oxide form in step a) may be used.

When sulphurization is carried out in situ, sulphurization of the catalyst of step b) is advantageously carried out at the same time as sulphurization of the catalyst of step a).

Application of the Process of the Invention in a Hydrocracking Process

The hydrotreatment process of the invention is advantageously carried out as a pre-treatment in a hydrocracking process, and more particularly in a hydrocracking process known as a "once-through" process or in a hydrocracking process known as a "two-step" process. The hydrocracking process can be used to convert oil fractions, in particular vacuum distillates (VD), into lighter products which can be upgraded more easily (gasoline, middle distillates).

A "once-through" hydrocracking process in the first place and in general comprises an intense hydrotreatment which is intended to carry out intense hydrodenitrogenation and desulphurization of the feed before it is sent to the hydrocracking catalyst or catalysts. Said once-through hydrocracking process is particularly advantageous when said hydrocracking catalyst(s) comprise(s) a support comprising zeolite crystals. This intense hydrotreatment of the feed only causes limited conversion of the feed into lighter fractions, which is still insufficient and thus has to be completed on more active hydrocracking catalyst(s). However, it should be noted that no separation of the effluents is carried out between the various catalytic beds: all of the effluent leaving the hydrotreatment catalytic bed is injected onto the catalytic bed or beds containing said hydrocracking catalyst(s), then separation of the products which are formed is carried out. This version of hydrocracking has a variation which involves recycling the unconverted fraction to at least one of the catalytic hydrocracking beds with a view to more intense conversion of the feed. Advantageously, the hydrotreatment process of the invention comprising the specific concatenation of steps a) and b) is carried out upstream of a hydrocracking catalyst in a once-through hydrocracking process. It also means that the quantity of organic nitrogen at the end of the pre-treatment step can be limited in order to protect the hydrocracking catalyst based on zeolite, which is highly sensitive to organic nitrogen.

A "two-step" hydrocracking process comprises a first step which, like the "once-through" process, is intended to carry out hydrotreatment of the feed, but also to obtain a conversion of the latter of the order of 40% to 60% in general. The effluent obtained from the first step then undergoes a separation, generally by distillation, usually termed intermediate separation, which is intended to separate the conversion products from the unconverted fraction. In the second step of the two-step hydrocracking process of the invention, only the fraction of the feed not converted during the first step is treated. This separation means that the two-step hydrocracking process of the invention can be more selective for middle distillate (kerosene+diesel) than the once-through process of the invention. In fact, intermediate separation of the conversion products avoids "overcracking" to naphtha and gas in the second step on the hydrocracking catalyst(s). Further, it should be noted that the unconverted fraction of the feed treated in the second step generally contains very small quantities of NH$_3$ as well as nitrogen-containing organic compounds, in general less than 20 ppm by weight or even less than 10 ppm by weight.

Said first step is carried out in the presence of the specific concatenation of catalysts of the invention and a hydrocracking catalyst in order to carry out hydrotreatment and conversion of the order of 40% to 60% in general. The catalytic beds of the specific concatenation of the catalysts of the invention are advantageously upstream of the hydrocracking catalyst. Said second step is generally carried out in the presence of a hydrocracking catalyst with a different composition from that in place for carrying out said first step.

The hydrocracking processes are generally carried out at a temperature in the range 250° C. to 480° C., advantageously in the range 320° C. to 450° C., preferably in the range 330° C. to 435° C., at a pressure in the range 2 to 25 MPa, preferably in the range 3 to 20 MPa, the hourly space velocity (volume flow rate of feed divided by the volume of catalyst) being in the range 0.1 to 20 h$^{-1}$, preferably in the range 0.1 to 6 h$^{-1}$, more preferably in the range 0.2 to 3 h$^{-1}$, and the quantity of hydrogen introduced is such that the volume ratio of liters of hydrogen/liters of hydrocarbon is in the range 80 to 5000 L/L, usually in the range 100 to 2000 L/L.

The hydrocracking catalysts are bifunctional in type: they combine an acid function and a hydrodehydrogenating function. The acid function is supplied by porous supports the surface areas of which generally vary from 150 to 800 m$^2$/g and having a superficial acidity, such as halogenated aluminas (in particular chlorinated or fluorinated), combinations of boron and aluminium oxides, amorphous or crystalline mesoporous aluminosilicates and zeolites dispersed in an oxide binder. The hydrodehydrogenating function is provided by the presence of an active phase based on at least one metal from group VIB and optionally at least one metal from group VIII of the periodic classification of the elements. The most widely used formulations are of the nickel-molybdenum (NiMo) and nickel-tungsten (NiW) type and, more rarely, of the cobalt-molybdenum (CoMo) type. After preparation, the hydrodehydrogenating function is often in the form of the oxide. The usual methods for forming the hydrodehydrogenating phase in HCK catalysts consist of depositing molecular precursor(s) of at least one metal from group VIB and optionally at least one metal from group VIII on an acidic oxide support using the technique known as "dry impregnation" followed by steps for maturation, drying and calcining, resulting in the formation of the oxidized form of the metal(s) employed. The active and stable form for the HCK processes is the sulphurized form, and so these catalysts have to undergo a sulphurization step. This may be carried out in the unit associated with the process (which is then termed in situ sulphurization) or prior to charging the catalyst into the unit (which is then termed ex situ sulphurization).

Application of the Process of the Invention in a FCC Process

Alternatively, the hydrotreatment process of the invention is advantageously carried out as a pre-treatment in a fluidized bed catalytic cracking process (FCC, Fluid Catalytic Cracking). The FCC process may be carried out in a conventional manner which is known to the skilled person under cracking conditions which are suitable for producing hydrocarbon products with a lower molecular weight. An example of a summarizing description of catalytic cracking (the first industrial use of which was back in 1936) (HOUDRY process) or in 1942 for the fluid catalytic cracking process) can be found in ULLMANS ENCYCLOPEDIA OF INDUSTRIAL CHEMISTRY VOLUME A 18, 1991, pages 61 to 64.

Usually, a conventional catalyst is used which comprises a matrix, an optional additive and at least one zeolite. The quantity of zeolite van vary, but is normally from approximately 3% to 60% by weight, often from approximately 6% to 50% by weight and more often from approximately 10% to 45% by weight. The zeolite is normally dispersed in the matrix. The quantity of additive is normally from approximately 0 to 30% by weight and often from approximately 0 to 20% by weight. The quantity of matrix represents the complement to 100% by weight. The additive is generally selected from the group formed by oxides of metals from group IIA of the periodic classification of the elements such as, for example, magnesium oxide or calcium oxide, rare earth oxides and titanates of metals from group IIA. The matrix is usually a silica, an alumina, a silica-alumina, a silica-magnesia, a clay or a mixture of two or more of these products. The most widely used zeolite is Y zeolite.

Cracking is carried out in a substantially vertical reactor, either in upflow mode (riser) or in downflow mode (dropper). The choice of catalyst and the operating conditions are functions of the desired products depending on the feed which is treated, as described, for example, in the article by M. MARCILLY, pages 990-991, published in the Institut Français du Pétrole review, November-December 1975, pages 969-1006. The operating temperature is usually from approximately 450° C. to approximately 600° C. and the residence time in the reactor is less than 1 minute, often from approximately 0.1 to approximately 50 seconds.

The pre-treatment may also be used to limit the quantity of organic nitrogen at the end of the pre-treatment step in order to protect the catalytic cracking catalyst based on zeolite which is highly sensitive to organic nitrogen.

EXAMPLES

The following examples demonstrate that a hydrotreatment process in accordance with the invention using a concatenation of catalysts in the oxide/additive-containing catalyst form has improved activity, in particular in HDN, and improved stability compared with a process using only additive-containing catalysts.

Preparation of Catalysts A, B, C and D:
Preparation of Support

A matrix composed of an ultrafine tabular boehmite or alumina gel was used. This gel was mixed with an aqueous solution containing 66% nitric acid (7% by weight of acid per gram of dry gel) then mixed for 15 minutes. At the end of this mixing, the paste obtained was passed through a die having cylindrical orifices with a diameter equal to 1.6 mm. The extrudates were then dried overnight at 120° C. and calcined at 600° C. for 2 hours in moist air containing 50 g of water per kg of dry air. Thus, extrudates of the support were obtained which had a specific surface area of 300 m$^2$/g. X ray diffraction analysis revealed that the support is solely composed of low crystallinity cubic gamma alumina.

Catalyst A: Calcined NiMoP/Alumina Catalyst

In the case of catalyst A based on nickel, the nickel, molybdenum and phosphorus were added to the alumina support described above which was in the form of extrudates. The impregnation solution was prepared by hot dissolving the molybdenum oxide and nickel hydroxycarbonate in the phosphoric acid solution in aqueous solution with the aim of producing an approximately 4/22/5 formulation, expressed as the % by weight of oxides of nickel and molybdenum and as the % by weight of phosphoric anhydride with respect to the quantity of dry matter in the final catalyst. After dry impregnation, the extrudates were allowed to mature in a water-saturated atmosphere for 8 h, then they were dried overnight at 90° C. Calcining at 450° C. for 2 hours resulted in catalyst A.

The final composition of catalyst A, expressed in the oxide form, was then as follows: $MoO_3$=22.0±0.2 (% by weight), NiO=4.1±0.1 (% by weight) and $P_2O_5$=5.0±0.1 (% by weight).

Catalyst B: NiMoP/Alumina Catalyst Supplemented with Acetic Acid and Dimethyl Succinate (DMSU)

In the case of catalyst B based on nickel, the nickel, molybdenum and phosphorus were added to the alumina support described above in the form of extrudates. The impregnation solution was prepared by hot dissolving molybdenum oxide and nickel hydroxycarbonate in the solution of phosphoric acid in aqueous solution with the aim of obtaining an approximately 5/25/6 formulation expressed as the % by weight of oxides of nickel and molybdenum and as the % by weight of phosphoric anhydride with respect to the quantity of dry matter of the final catalyst. After dry impregnation, the extrudates were allowed to mature in a water-saturated atmosphere for 8 h, then they were dried overnight at 90° C. The dried impregnated support for catalyst C was then supplemented by dry impregnation of a solution containing a mixture of dimethyl succinate (DMSU) and acetic acid (75% pure). The molar ratios were as follows: DMSU/Mo=0.85 mol/mol, DMSU/acetic acid=0.5 mol/mol. Next, the catalyst underwent a maturing step for 3 h at 20° C. in air, followed by drying in a flushed bed type oven at 120° C. for 3 h.

The final composition of catalyst B, expressed in the oxide form, was thus as follows: $MoO_3$=25.1±0.2 (% by weight), NiO=5.1±0.1 (% by weight) and $P_2O_5$=6.0±0.1 (% by weight).

Catalyst C: NiMoP/Alumina Catalyst Supplemented with Citric Acid

In the case of catalyst C based on nickel, the nickel, molybdenum and phosphorus were added to the alumina support described above in the form of extrudates. The impregnation solution was prepared by hot dissolving molybdenum oxide and nickel hydroxycarbonate and citric acid in the solution of phosphoric acid in aqueous solution with the aim of obtaining an approximately 5/25/6 formulation, expressed as the % by weight of oxides of nickel and molybdenum and as the % by weight of phosphoric anhydride with respect to the quantity of dry matter of the final catalyst. The quantity of citric acid, expressed as the molar ratio with respect to molybdenum, was: citric acid/Mo=0.4 mol/mol. After dry impregnation, the extrudates were allowed to mature in a water-saturated atmosphere for 8 h, then they were dried overnight at 90° C. then dried in a flushed bed type oven at 140° C. for 3 h.

The final composition of catalyst C, expressed in the oxide form, was thus as follows: $MoO_3$=22.5±0.2 (% by weight), NiO=4.2±0.1 (% by weight) and $P_2O_5$=5.0±0.1 (% by weight).

Catalyst D: NiMoWP/Alumina Catalyst Supplemented with Citric Acid

A silica-alumina powder was prepared by co-precipitation with a composition of 30% $SiO_2$ and 70% $Al_2O_3$. A catalyst support containing this silica-alumina was then produced. To this end, a matrix composed of the silica-alumina prepared above was mixed with an aqueous solution containing 66% nitric acid (7% by weight of acid per gram of dry gel), then mixed for 15 minutes. At the end of this mixing, the paste obtained was passed through a die having trilobal orifices with a diameter of 2 mm. The extrudates were then dried overnight at 120° C. and calcined at 550° C. for 2 hours in air. Finally, the extrudates underwent a steam treatment at 750° C. for 2 h. These extrudates constituted the silica-alumina support. The impregnation solution was prepared by hot dissolving molybdenum oxide and nickel hydroxycarbonate, phosphotungstic acid and citric acid in an aqueous phosphoric acid solution with the aim of obtaining an approximately 6/2/18/5 formulation, expressed as the % by weight of oxides of nickel, molybdenum and tungsten and as the % by weight of phosphoric anhydride with respect to the quantity of dry matter in the final catalyst. The quantity of citric acid, expressed as the molar ratio with respect to the molybdenum, was: citric acid/Mo=0.4 mol/mol.

The final composition of catalyst D, expressed in the oxide form, was thus as follows: $MoO_3$=6.2±0.2 (% by weight), NiO=2.4±0.1 (% by weight), $WO_3$=18.1±0.1 (% by weight) and $P_2O_5$=5.0±0.1 (% by weight).

Evaluation of Various Concatenations of Catalysts A, B, C and D in the Hydrotreatment of a Vacuum Distillate The feed used was a vacuum distillate at a WAT of 474° C. (T5%=389° C., T50%=468° C., T70%=498° C.). The characteristics of the feed were as follows: sulphur 2.6% by weight, nitrogen 1350 ppm, basic nitrogen 392 ppm, resins 9.1% by weight.

The test was carried out in an isothermal pilot reactor with a fixed flushed bed, with the fluids moving from bottom to top. The reactor comprised two catalytic zones for evaluating various concatenations of the catalysts A, B, C and D. The feed passed initially over the first zone charged with the first catalyst, then the second zone charged with the second catalyst.

In accordance with Example 1 (not in accordance with the invention), the entirety of the two catalytic zones (100% of the volume) contained additive-containing catalyst (catalyst B).

In accordance with Example 2 (not in accordance with the invention), the entirety of the two catalytic zones (100% of the volume) contained calcined catalyst (catalyst A).

In accordance with Examples 3, 4 and 5 (in accordance with the invention), the first zone was charged with a calcined catalyst (catalyst A: 30% of the volume), then the second with an additive-containing catalyst (catalyst B, C or D: 70% of the volume).

After in situ sulphurization at 350° C. in the unit pressurized with vacuum distillate to which 2% by weight of dimethyldisulphide had been added, the hydrotreatment test was carried out under the following operating conditions: a total pressure of 150 bar (15 MPa), a HSV of 2 $h^{-1}$, a $H_2$/feed ratio of 1000 L/h and a temperature of 380° C.

The following table shows the percentage HDN and HDS obtained in the reactor as well as the stability of the catalytic concatenation. The percentage HDN was calculated as follows: HDN (%)=$(N_{outlet}-N_{inlet})/N_{inlet}$. The percentage HDS was calculated as follows: HDS (%)=$(S_{outlet}-S_{inlet})/S_{inlet}$. The stability was calculated as follows: (% HDN at 600 h/% HDN at 300 h).

The results clearly show that the "catalyst in the oxide form/additive-containing catalyst" concatenation (Examples 3, 4 and 5) can be used to obtain a catalytic activity in HDN which is higher while keeping the HDS high, and a higher stability than a concatenation of additive-containing catalysts alone (Example 1) or a concatenation of "catalyst in the oxide form" alone (Example 2).

TABLE

HDN, HDS and stability

| Example | Catalyst charged into the reactor (first zone/second zone) | HDN (%) | HDS (%) | stability |
|---|---|---|---|---|
| 1, comparative | 100% vol catalyst B (additive-containing NiMoP) | 93 | 99.8 | 90 |
| 2, comparative | 100% vol catalyst A (calcined NiMoP) | 84 | 99.8 | 90 |
| 3, in accordance with the invention | 30% vol catalyst A (calcined NiMoP) + 70% vol catalyst B (additive-containing NiMoP) | 96 | 99.8 | 95 |
| 4, in accordance with the invention | 30% vol catalyst A (calcined NiMoP) + 70 vol catalyst C (additive-containing NiMoP) | 94 | 99.9 | 92 |
| 5, in accordance with the invention | 70% vol catalyst A (calcined NiMoP) + 30% vol catalyst D (additive-containing NiMoWP) | 95 | 99.8 | 92 |

The invention claimed is:

1. A fluid catalytic cracking process implementing a process for the hydrotreatment of a hydrocarbon feed containing nitrogen-containing compounds in an amount of more than 250 ppm by weight and having a weighted average temperature of more than 380° C., comprising the following steps:
   a) bringing said hydrocarbon feed into contact, in the presence of hydrogen, with at least one first catalyst comprising an amorphous support based on alumina, phosphorus, and an active phase formed by at least one metal from group VIB in the oxide form and at least one metal from group VIII in the oxide form, said first catalyst being prepared in accordance with a process comprising at least one calcining step;
   b) bringing the effluent obtained in step a) into contact, in the presence of hydrogen, with at least one second catalyst comprising an amorphous support based on alumina, phosphorus, an active phase formed by at least one metal from group VIB and at least one metal from group VIII, and at least one organic compound containing oxygen and/or nitrogen, said second catalyst being prepared in accordance with a process comprising the following steps:
      i) bringing at least one component of a metal from group VIB, at least one component of a metal from group VIII, phosphorus and at least one organic compound containing oxygen and/or nitrogen into contact with the support, so as to obtain a catalyst precursor;
      ii) drying said catalyst precursor obtained from step i) at a temperature of less than 200° C., without subsequent calcining;
   in order to obtain a hydrotreated effluent,
   wherein said hydrotreated effluent is brought into contact, under catalytic cracking operating conditions, with at least one catalytic cracking catalyst so as to obtain a cracked effluent.

2. A process according to claim 1, in which the hydrocarbon feed in the process for the hydrotreatment has a sulphur content in the range of 0.01 to 5% by weight.

3. A process according to claim 1, wherein in the process for the hydrotreatment the catalyst of step a) in oxide form is more active in hydrodenitrogenation than the catalyst of step b) and wherein the second catalyst of step b) is an active hydrodesulphurization catalyst.

4. A process according to claim 1, wherein in the process for the hydrotreatment, for the catalyst of step a) or b), the metal from group VIB is molybdenum, tungsten or a mixture of these two elements, and the metal from group VIII is cobalt, nickel or a mixture of these two elements.

5. A fluid catalytic cracking process comprising a hydrotreatment process of a hydrocarbon feed containing nitrogen-containing compounds in an amount of more than 250 ppm by weight, with a sulphur content in the range of 0.01 to 5% by weight, and having a weighted average temperature of more than 380° C., comprising the following steps:
   a) bringing said hydrocarbon feed into contact, in the presence of hydrogen, with at least one first catalyst comprising an amorphous support based on alumina, phosphorus, and an active phase formed by at least one metal from group VIE in the oxide form and at least one metal from group VIII in the oxide form, said first catalyst being prepared in accordance with a process comprising at least one calcining step;
   b) bringing the effluent obtained in step a) into contact, in the presence of hydrogen, with at least one second catalyst comprising an amorphous support based on alumina, phosphorus, an active phase formed by at least one metal from group VIB and at least one metal from group VIII, and at least one organic compound containing oxygen and/or nitrogen, said second catalyst being prepared in accordance with a process comprising the following steps:
      i) bringing at least one component of a metal from group VIE, at least one component of a metal from group VIII, phosphorus and at least one organic compound containing oxygen and/or nitrogen into contact with the support, so as to obtain a catalyst precursor;
      ii) drying said catalyst precursor obtained from step i) at a temperature of less than 200° C., without subsequent calcining;
   in order to obtain a hydrotreated effluent,
   wherein the first catalyst of step a) in oxide form is more active in hydrodenitrogenation than the catalyst of step b) and wherein the second catalyst of step b) is an active hydrodesulphurization and hydrodenitrogenation catalyst,
   in which said hydrotreated effluent is brought into contact, under catalytic cracking operating conditions, with at least one catalytic cracking catalyst so as to obtain a cracked effluent.

* * * * *